(12) United States Patent
Pereira

(10) Patent No.: US 7,941,037 B1
(45) Date of Patent: May 10, 2011

(54) AUDIO/VIDEO TIMESCALE COMPRESSION SYSTEM AND METHOD

(75) Inventor: Mark A. Pereira, Livermore, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2095 days.

(21) Appl. No.: 10/229,605

(22) Filed: Aug. 27, 2002

(51) Int. Cl.
  *H04N 5/928* (2006.01)
(52) U.S. Cl. .......................... 386/339; 704/500
(58) Field of Classification Search ............... 386/96, 386/98; 381/22, 23; 700/94; 704/500–504, 704/200.1
  See application file for complete search history.

(56) References Cited

U.S. PATENT DOCUMENTS

| | | | | |
|---|---|---|---|---|
| 5,664,044 A | 9/1997 | Ware | | 386/75 |
| 5,699,404 A | 12/1997 | Satyamurti et al. | | 379/57 |
| 5,899,969 A * | 5/1999 | Fielder et al. | | 704/225 |
| 6,154,600 A * | 11/2000 | Newman et al. | | 386/4 |
| 6,278,387 B1 * | 8/2001 | Rayskiy | | 341/61 |
| 6,304,847 B1 | 10/2001 | Jhung | | 704/500 |
| 6,718,309 B1 * | 4/2004 | Selly | | 704/503 |
| 6,842,735 B1 * | 1/2005 | Covell et al. | | 704/503 |
| 6,963,646 B2 * | 11/2005 | Takagi et al. | | 381/23 |
| 6,967,599 B2 * | 11/2005 | Choi et al. | | 341/61 |
| 6,999,598 B2 * | 2/2006 | Foote et al. | | 382/100 |
| 7,047,201 B2 * | 5/2006 | Chang | | 704/503 |
| 2003/0229901 A1 * | 12/2003 | Amir et al. | | 725/95 |

OTHER PUBLICATIONS

Richard Stenger and Daniel Sieberg, "PlayStation 2 makes its North American debut," Oct. 26, 2000, CNN.com [online]; http://archives.cnn.com/2000/TECH/computing/10/26/ps2.main.story/index.html.*
Michele Covell et al., "Modification of Audible and Visual Speech", 1999, IOS Press.

* cited by examiner

*Primary Examiner* — Marsha D Banks Harold
*Assistant Examiner* — Christopher Findley
(74) *Attorney, Agent, or Firm* — Zilka-Kotab, PC

(57) ABSTRACT

A system and method are provided for time scaling playback of digital audio signals with associated digital video signals. Initially, the digital video signals and the digital audio signals are received. Next, the digital audio signals are processed for the time scaling thereof while substantially preserving the frequency pitch of the digital audio signals. The processed audio signals are then encoded. Such encoded audio signals are then outputted for accelerated playback with the associated digital video signals.

59 Claims, 9 Drawing Sheets

AUDIO/VIDEO TIMESCALE COMPRESSION SYSTEM AND METHOD

FIELD OF THE INVENTION

The present invention relates to timescale compression, and more particularly to the timescale compression of content in the context of digital video disc (DVD) playback.

BACKGROUND OF THE INVENTION

Time-scaling methods are used to compress and expand video and audio signals. It is well known in the art how to speed up and slow down video. This is done in video disk players and video cassette recorders routinely. Since the video is encoded on a frame-by-frame basis, the rate of frame display is slowed down or sped up, and each frame is displayed on a display device for a corresponding longer or shorter period, respectively.

It is also well known in the art how to speed up and slow down audio by itself without significant distortion. Slowing down audio, or [0]time scale "expansion," overlaps the same audio block and performs an add function for essentially duplicating time. Various techniques most commonly used to accomplish acceleration, on the other hand, include Time Domain Harmonic Scaling (TDHS), dropping frames, and Synchronize Overlap and Add (SOLA) algorithms. While simply dropping frames results in gaps in the audio signals and associated frequency distortion, algorithms such as SOLA substantially preserve the frequency pitch of the digital audio signals.

Prior Art FIG. 1 illustrates the SOLA algorithm 100, in accordance with the prior art. SOLA begins by "chunking" input into frames. Thereafter, a rough estimate of the output-frame spacing is calculated based on a target compression rate. This final spacing is set to the position of the maximum cross correlation near the desired spacing. SOLA creates output audio by cross fading frames, using this new frame offset.

As can be seen from the above discussion, the prior art includes numerous techniques for variable speed playback of digital audio alone and variable speed playback of digital video alone.

However, there is a need for a system and method which uses the foregoing techniques to provide a way for a user who is playing back digital audio/video (A/V) content from a digital medium [i.e. digital video disc (DVD)] to vary the speed of presentation and be presented with synchronized, high quality simultaneous audio and video. This would allow the user to cue the information based on either the audio or the video content, or both, and to slow down or speed up the rate of presentation and still perceive both the audio and the video.

Many makers of digital mediums (i.e. DVDs) are currently implementing particular compression algorithms. Representative compression algorithms are MPEG and Dolby® AC-3. Those of skill in the art will appreciate that the MPEG and AC-3 algorithms are well known, evolving standards. Accordingly, reference herein to these standards will be understood to mean the video and audio compression standards as they existed at the time of the earliest effective filing date of the present application, and as they have evolved to date, and as they continue to evolve over the term of any patent that issues herefrom.

In particular, the AC-3 standard was adopted as the audio standard for North American High-Definition Television (HDTV) systems. The AC-3 standard has recently been applied to the DVD's, Direct Broadcasting System (DBS), Set Top Box (STB), digital cable, etc. The AC-3 compression algorithm also uses the human psychoacoustic characteristic as a basis for audio compression. In order to implement a compression algorithm such as the AC-3 standard, AC-3 encoders and decoders are often required. Various prior art systems currently incorporate such encoders and decoders, but not for the purpose of playing back high quality synchronized, time-scaled content from digital mediums (i.e. DVDs).

Prior Art FIG. 2 illustrates a DVD playback system 200, in accordance with the prior art. As shown, a DVD player 202 is provided which is adapted for reading video signals and audio signals from a DVD. Most frequently, such video signals take the form of MPEG video signals, while the audio signals include AC-3 audio signals.

Also included is a video decoder 204 for decoding the MPEG video signals for producing a video output signal. Still yet, an audio decoder 206 is included for decoding the AC-3 audio signals for producing an uncompressed digital audio output signal. Optionally, the audio decoder 206 may be bypassed for producing a digital audio output signal still encoded in the compressed format, in the manner shown.

Unfortunately, the DVD playback system 200 simply does not include the ability to speed up and slow down audio in conjunction with speeding up and slow downing video read from a digital medium (i.e. DVD) in a quality manner.

Prior Art FIG. 3 illustrates a more general system 300 including the components of the DVD playback system 200, but utilizing a Von Neumann-type architecture. The architecture of such a system 300 may be found in game units such as the XBOX® manufactured by Microsoft® Corporation.

As shown, a DVD player 302, a video decoder 304, and an AC-3 decoder 306 are provided, similar to those of the DVD playback system 200 of Prior Art FIG. 2. Further provided is an AC-3 encoder 308 for producing a compressed and encoded digital audio signal from an uncompressed digital audio signal. Still yet, a central processing unit (CPU) 310 may be provided for performing general processing or functionally implement the decoder or encoder processors. Associated therewith is graphics processing hardware 312 for accelerating graphics processing. Still yet, memory 314 is provided for storage purposes. All of the foregoing components may be interconnected via a bus 318, as shown.

Currently, components such as the AC-3 encoder 308 are used in the context of the aforementioned game units for generating compressed digital audio during the play of games, etc. However, there lacks any ability to speed up and slow down digital audio in conjunction with speeding up and slow downing video read from a digital medium (i.e. DVD) in a quality manner.

Prior Art FIG. 4 illustrates a flow of operation 400 that may be carried out using the general system 300 of Prior Art FIG. 3. As shown, a DVD player 302, a video decoder 304, an AC-3 decoder 306, an AC-3 encoder 308, a CPU 310, and graphics processing hardware 312 are provided.

As shown, the DVD player 302 may be used for reading video signals and audio signals from a DVD. Most frequently, such video signals take the form of MPEG video signals, while the audio signals include AC-3 audio signals. The MPEG video signals are fed to the video decoder 304 for generating video output signals. Still yet, the AC-3 encoded audio signals are output directly as encoded digital audio, or optionally sent to the AC-3 decoder 306 and output as an uncompressed digital audio signal.

In use, the AC-3 decoder 306 decodes the AC-3 audio signals for producing uncompressed digital audio output signals. Further, the CPU 310 may be used to process other various video and audio signals in conjunction with the graphics processor hardware 312 and the AC-3 encoder 308, respectively. Thus, the CPU 310 is adapted to produce video output signals, uncompressed digital audio signals, and compressed digital audio signals utilizing the graphics processor hardware 312 and the AC-3 encoder 308 in the manner shown. Each of the aforementioned video output signals, uncompressed digital audio signals, and compressed digital audio signals may be selectively outputted utilizing multiplexers 402 in the manner shown.

Unfortunately, the general system 400 of Prior Art FIG. 4 fails to process the uncompressed digital audio signals outputted from the AC-3 decoder 306 for time-scaling purposes. Again, there lacks any ability to speed up and slow down audio in conjunction with speeding up and slow downing video read from a digital medium (i.e. DVD) in a quality manner.

There is thus a need for a system and method of speeding up and slow downing audio in conjunction with speeding up and slow downing video read from a digital medium (i.e. DVD) in a quality manner.

DISCLOSURE OF THE INVENTION

A system and method are provided for time scaling playback of digital audio signals with associated digital video signals. Initially, the digital video signals and the digital audio signals are received. Next, the digital audio signals are processed for the time scaling thereof while substantially preserving the frequency pitch of the digital audio signals. The processed audio signals are then encoded. Such encoded audio signals are then outputted for accelerated playback with the associated digital video signals.

In one embodiment, the received digital audio signals may be decoded from a compressed format after being received. Further, the digital audio signals may be encoded to the compressed format after the processing.

In another embodiment, the digital audio signals may be processed utilizing a digital video disc (DVD) player, a personal computer, and/or a game unit. Still yet, the digital audio signals may be received from a digital video disc (DVD), compact disc-read only memory (CD-ROM), or the like.

In still yet another embodiment, the processing may utilize a Synchronize Overlap and Add (SOLA) process. Still yet, the digital audio signals may be processed utilizing filters. In particular, the processing may include filtering the audio signals into at least two frequency ranges utilizing the filters. Such two frequency ranges may then be processed differently. For example, the at least two frequency ranges may be processed using windows of samples of different sizes.

The foregoing processing may further include time shifting the windows of samples of the at least two frequency ranges. Each window of samples may be time shifted a common percentage of a size of the window. The processing continues by combining the windows of samples of the at least two frequency ranges.

As an option, randomly sized windows of samples of the audio signals may be used during the processing.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings.

Prior Art

Prior Art

Prior Art

Prior Art

DESCRIPTION OF THE PREFERRED EMBODIMENTS

Figure 1:
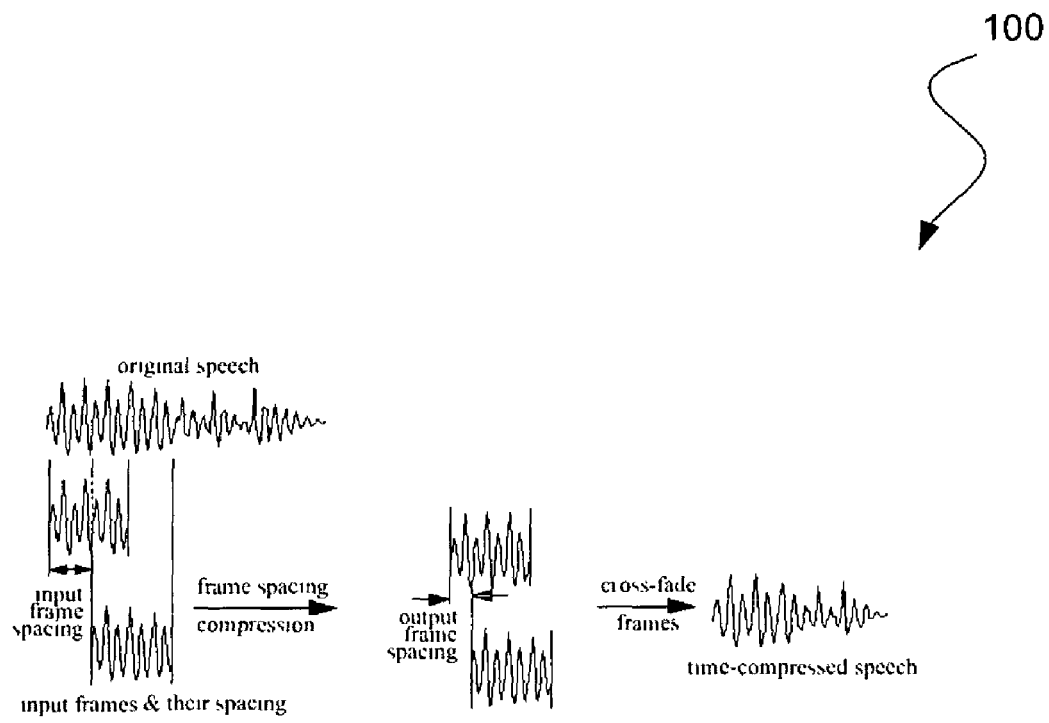
FIG. 1 illustrates a Synchronize Overlap and Add (SOLA) algorithm, in accordance with the prior art.
Figure 2:
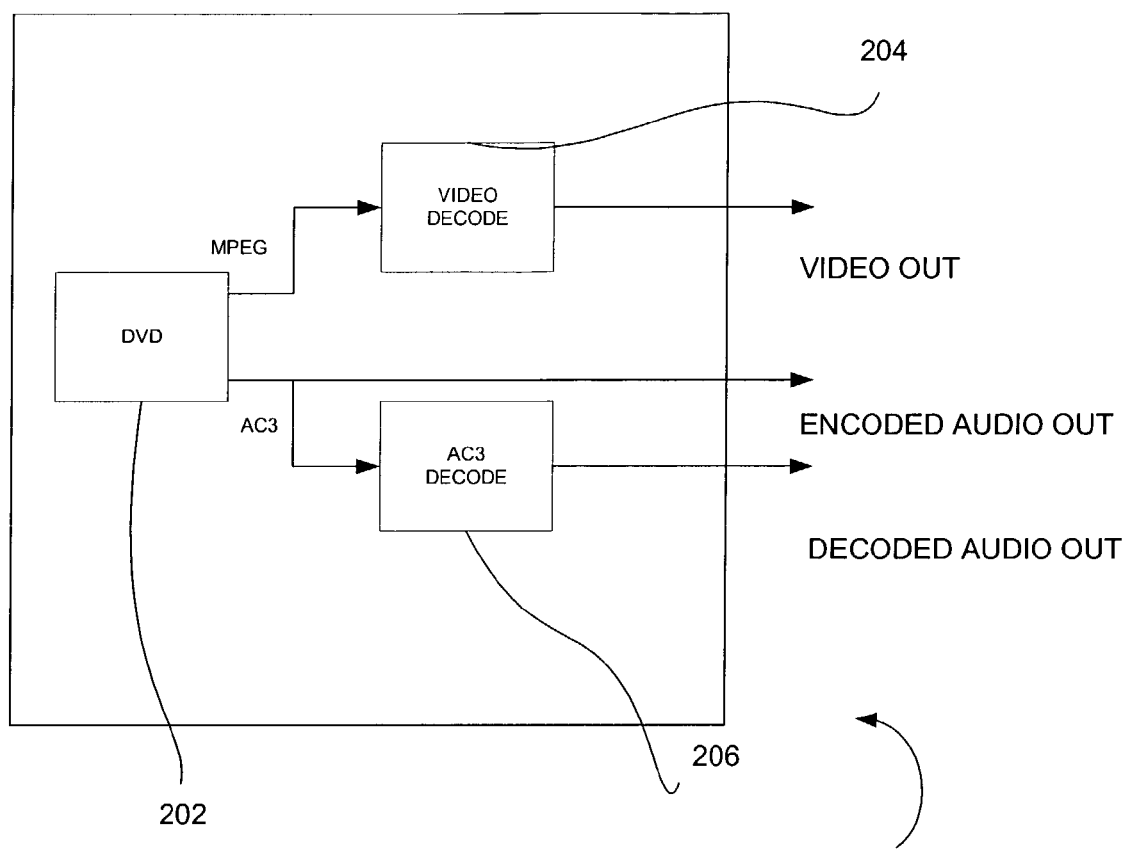
FIG. 2 illustrates a digital video disk (DVD) playback system, in accordance with the prior art.

FIGS. 1-4 illustrate the prior art. FIG. 5 illustrates a playback system 500, in accordance with one embodiment. As shown, a digital video disk (DVD) player 502 is provided which is adapted for reading video signals and audio signals from a DVD. While a DVD player is shown in the present example, it should be noted that any digital medium player may be used in the context of the present embodiment. For example, the player may be capable of reading digital signals from a compact disk-read only memory (CD-ROM), hard drive, digital transmission medium, or any other digital medium per the desires of the user. Moreover, the present playback system 500 may be implemented in any desired context such as a DVD player stand-alone unit, a personal computer (i.e. desktop, lap-top, PDA, etc.), a game unit, etc.

While the aforementioned signals may take any desired form, the video signals may, in one embodiment, include MPEG video signals, while the audio signals include AC-3 audio signals. Of course, however, the audio signals may take on any compressed standard (i.e. DTS, etc.). As such, also included is a video decoder 504 coupled to an output of the DVD player 502 for decoding the MPEG video signals to produce video output signals. Still yet, an audio decoder 506 is coupled to an output of the DVD player 502 for decoding the audio signals to produce uncompressed digital audio signals.

The playback system 500 is particularly distinguishable from the aforementioned prior art systems in view of the inclusion of a processor 508 coupled to an output of the audio decoder 506. In use, the processor 508 is capable of processing the decoded audio signals for various purposes such as time-scaling. It should be noted that such time-scaling may be initiated automatically or manually by a user for various purposes (i.e. searching content on a digital medium, accelerated viewing, etc.) As shown in FIG. 5, the processed audio signals may be directly outputted in the form of uncompressed digital audio output signals.

In one embodiment, such processing may particularly include the time scaling (i.e. acceleration, slowing down, etc.) of the audio signals while substantially preserving the frequency pitch of the audio signals. By way of example, audible frequency anomalies may be avoided including any noticeable shift in frequency, or pitch, of the audio signals. In one particular embodiment, the aforementioned time-scaling may take the form of a Synchronize Overlap and Add-type (SOLA) algorithm. More information regarding such an exemplary algorithm will be set forth in greater detail during reference to FIGS. 7 and 8.

Also included is an AC-3 encoder 510 coupled to an output of the processor 508 for re-encoding the processed digital audio signals in the AC-3 compressed digital audio format for output in compressed digital audio form. Thus, the present embodiment is capable of decoding AC-3 compressed digital audio signals received from a digital medium (i.e. DVD), time-scaling the decoded audio signals, and re-encoding the same in AC-3 compressed digital audio format for quality digital playback. Hence, the decoder 506 is coupled to the encoder 510 via the processor 508.

Figure 3:
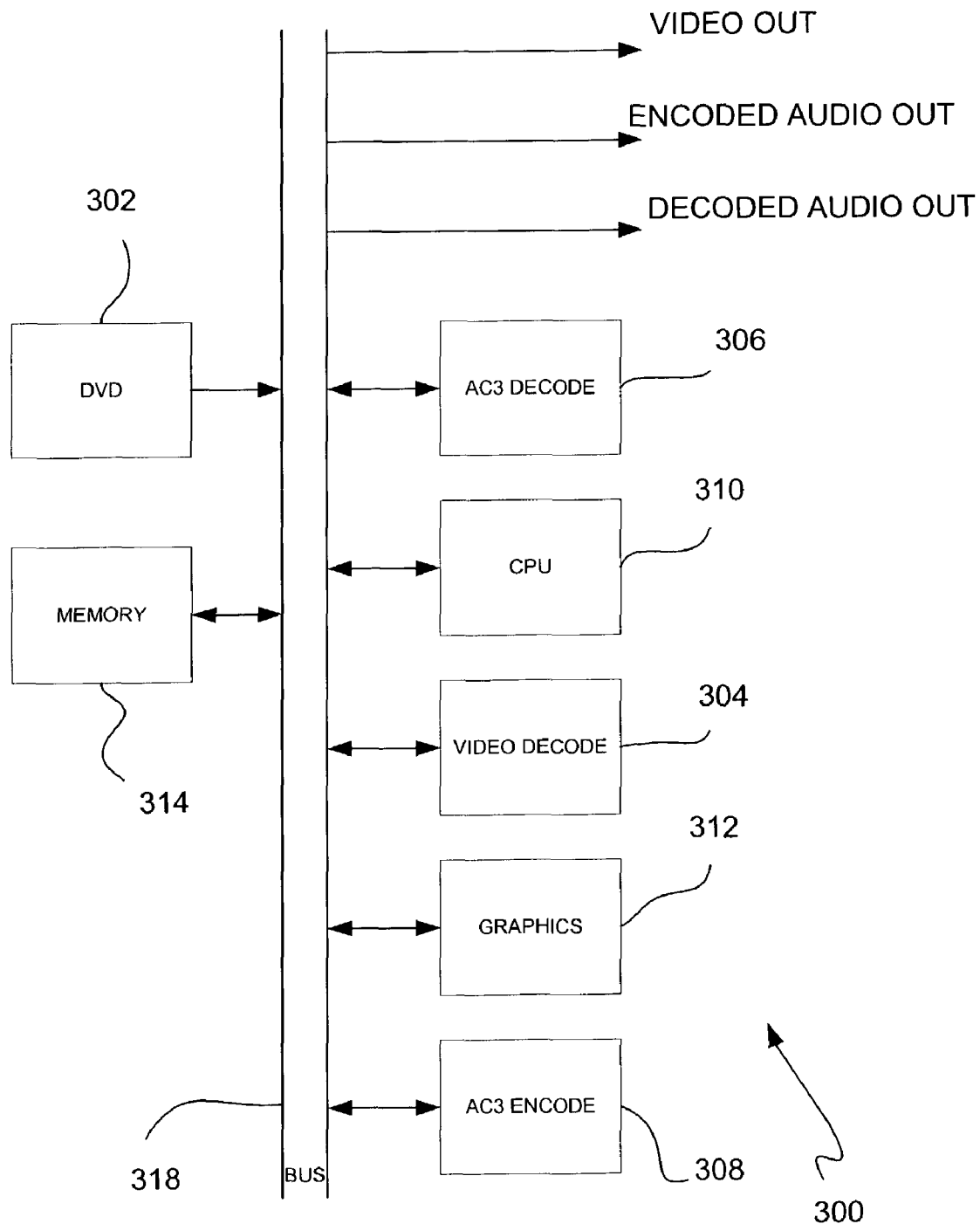
FIG. 3 illustrates a more general system including the components of the DVD playback system of FIG. 2, but utilizing a Von Neumann architecture.
Figure 6:
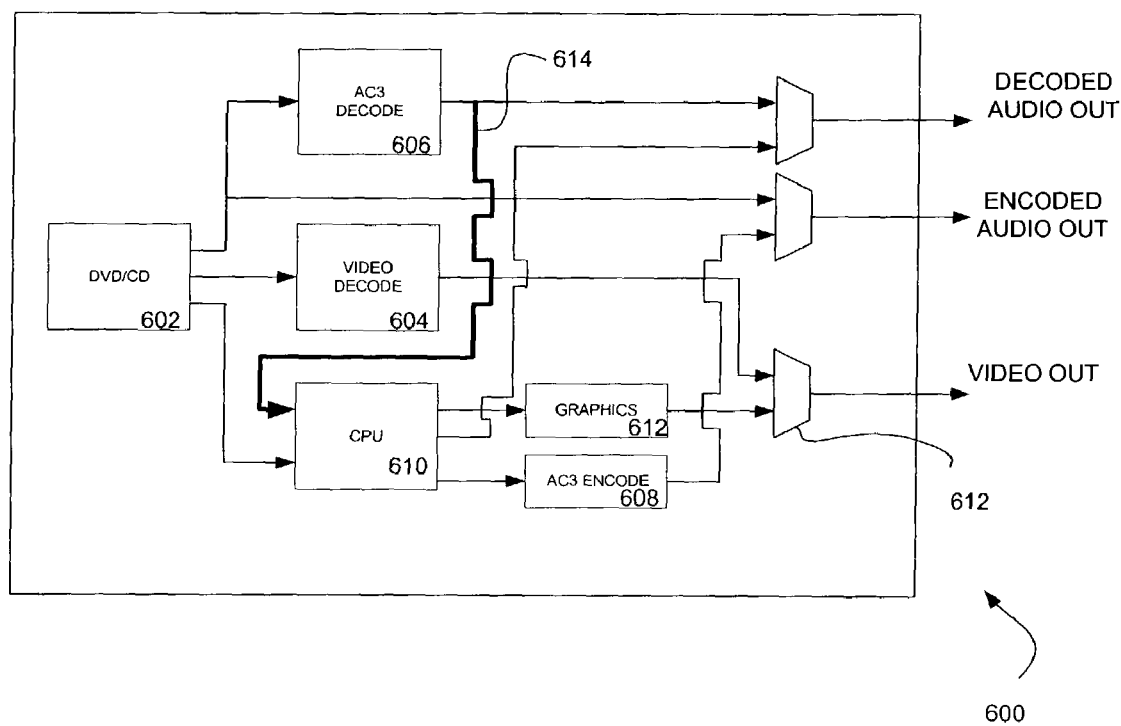
FIG. 6 illustrates an improved flow of operation that may be carried out using the general system of Prior Art FIG. 3.

FIG. 6 illustrates an improved flow of operation 600 that may be carried out using the general system 300 of Prior Art FIG. 3. As shown, a DVD player 602 may be used for reading video signals and audio signals from a DVD. Again, it should be noted that any digital medium player may be used in the context of the present embodiment. In an embodiment where such video signals take the form of MPEG video signals and the audio signals include AC-3 audio signals, the MPEG video signals are fed to a video decoder 604 for generating video output signals. Still yet, the AC-3 audio signals are sent to a AC-3 decoder 606 and a central processing unit (CPU) 610.

In use, the AC-3 decoder 606 decodes the AC-3 compressed audio signals for producing uncompressed digital audio output signals. Further, the CPU 610 may be used to process other various video and audio signals in conjunction with the graphics processor hardware 612 and the AC-3 encoder 608, respectively.

Thus, the CPU 610 is adapted to produce video output signals, uncompressed digital audio signals, and compressed digital audio signals utilizing the graphics processor hardware 612 and the AC-3 encoder 608 in the manner shown. Each of the aforementioned video output signals, digital audio signals, and compressed digital audio signals may then be selectively outputted utilizing multiplexers 612 in the manner shown.

Figure 4:
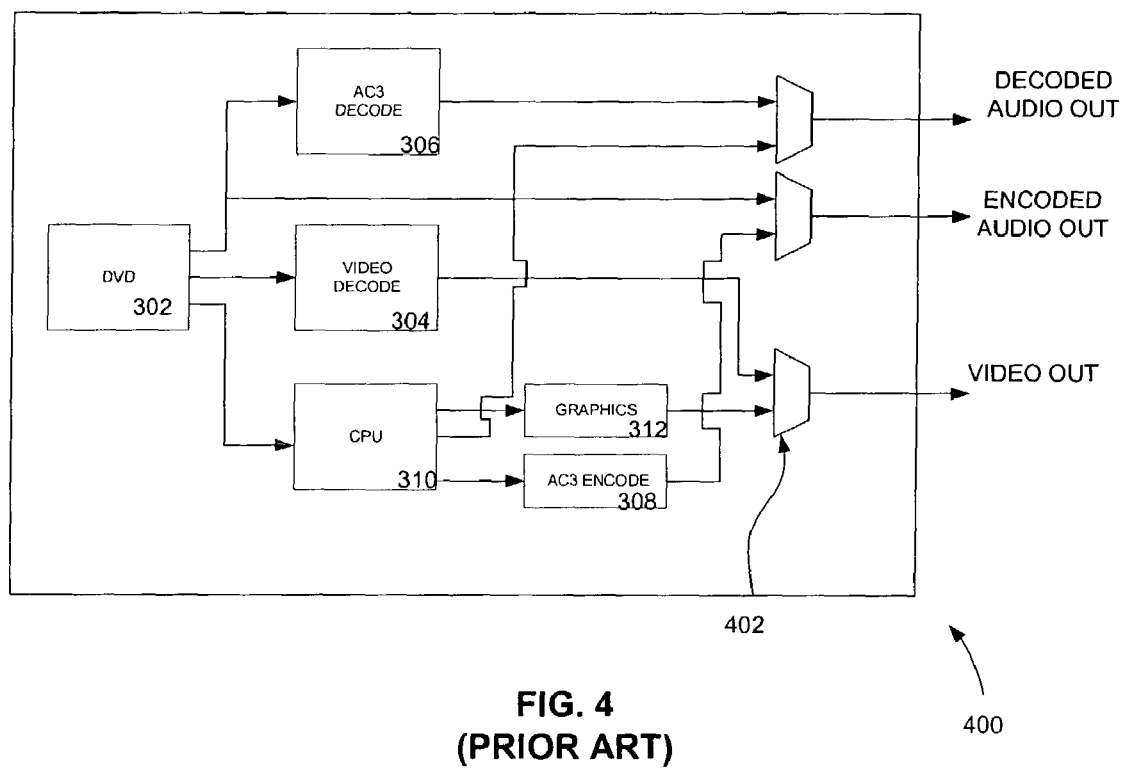
FIG. 4 illustrates a flow of operation that may be carried out using the general system of Prior Art FIG. 3.
Figure 5:
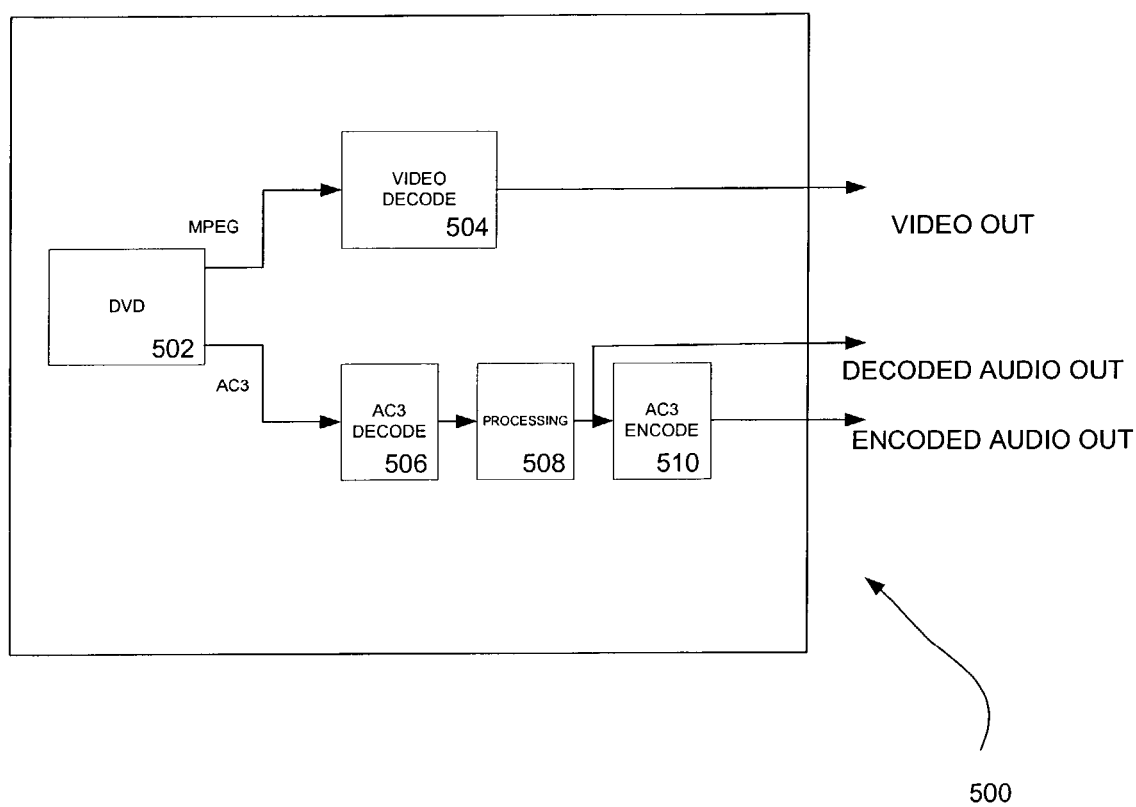
FIG. 5 illustrates a playback system, in accordance with one embodiment.

In prior art flows such as that shown in Prior Art FIG. 4, there simply lacked any type of flow of decoded AC-3 compressed digital audio signals from the AC-3 decoder 604 to the CPU 610 for processing (i.e. time-scaling) and re-encoding using the AC-3 encoder 608. With the addition of the flow 614, however, such functionality may be accomplished utilizing the present embodiment. More information regarding the specific manner in which the foregoing systems may be used to accelerate audio signals will now be set forth.

Figure 7:
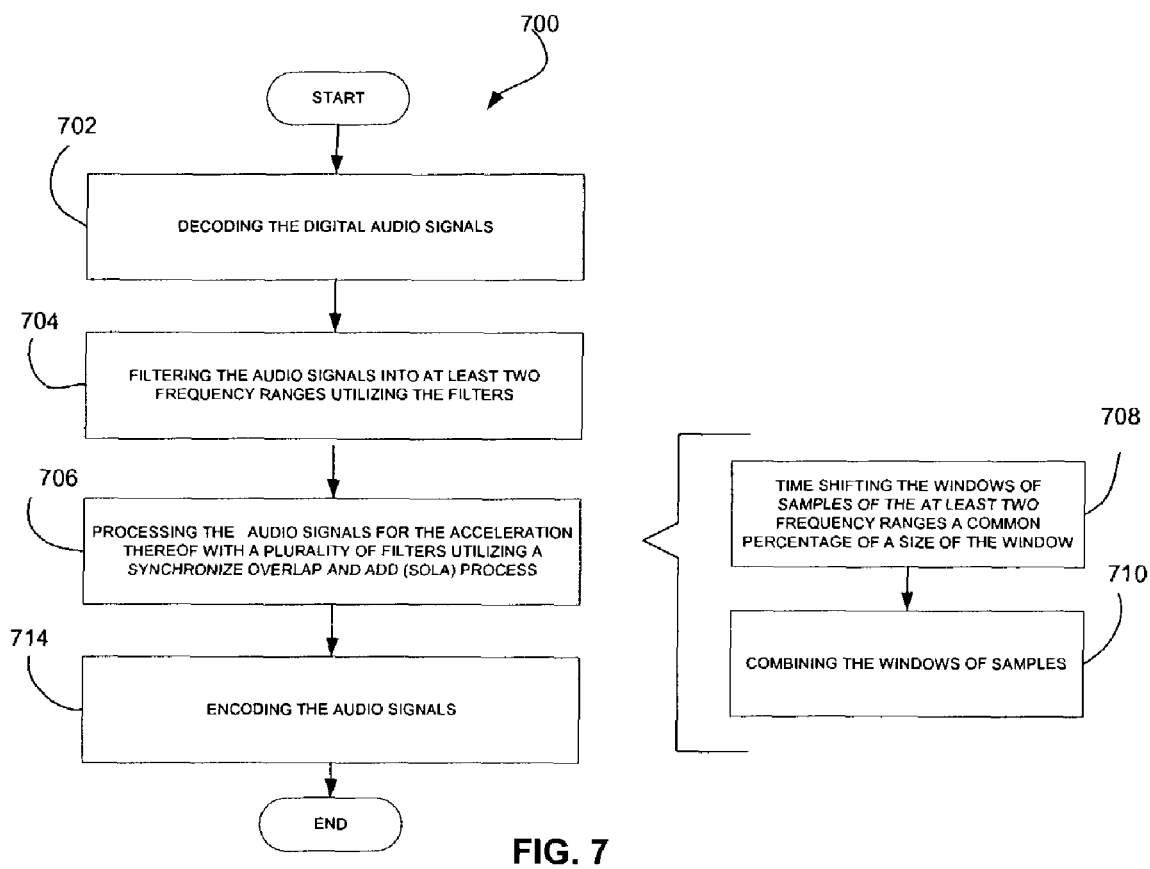
FIG. 7 illustrates a method by which decoded AC-3 audio signals from a digital medium (i.e. DVD) are processed utilizing a central processing unit (CPU) for time scaling purposes before being re-encoded for digital playback, in accordance with one embodiment.

FIG. 7 illustrates a method 700 by which uncompressed digital audio signals from a digital medium (i.e. DVD) are processed utilizing a CPU for time scaling purposes before being re-encoded for digital playback, in accordance with one embodiment. In one embodiment, the present method 700 may be carried out in the context of the exemplary architectures/flows of FIGS. 5 and 6. Of course, however, the present method 700 may be implemented in the context of any desired architecture.

As shown, in operation 702, digital audio signals are first decoded. In the case where the compressed digital audio signals take on an AC-3 format, this may be accomplished utilizing an AC-3 decoder like the ones mentioned hereinabove. Again, it should be understood that the digital audio signals may be received from any desired digital medium (i.e. DVD).

To carry out the next process, the audio signals are filtered into at least two frequency ranges utilizing a plurality of filters in operation 704.

Next, in operation 706, the audio signals are processed for the acceleration thereof utilizing a SOLA process. In one embodiment, this processing may be accomplished utilizing a central processor, an application-specific processor, or any desired supporting framework.

Often, audible frequency anomalies such as frequency shifts result from accelerated playback. Such frequency shifts are most notably characterized by an increase in "pitch" in the audio signals.

In use, the SOLA process is capable of accelerating the audio signals while substantially preserving the frequency pitch thereof, when the acceleration is limited to less than twice the normal speed. Of course, various modifications may be made to the SOLA process to improve the ability to accelerate audio signals without audible frequency anomalies at faster speeds. In one embodiment, the acceleration may be set at 1.33× for optimal usage. One example of the SOLA process of operation 706 is shown by operations 708-710.

It should be noted that the SOLA process is carried out using windows of samples of the audio signals. These windows may have different sizes based on the associated frequency range. Note again operation 704. Essentially, such windows each comprise a subset of the sequence of the samples that make up the audio signals.

In operation 708, the windows of samples of the at least two frequency ranges are shifted a common percentage of a size of the windows (i.e. a substantially fixed percentage of the window's number of samples). Such shifting causes the windows to overlap in time. As an option, the samples may even be weighted. Still yet, in operation 710, the windows of samples of the at least two frequency ranges are combined. As an option, the combining may be performed on samples corresponding to an approximately identical time. The foregoing SOLA process is further illustrated in the diagram set forth in FIG. 8 which will be described hereinafter in greater detail.

In another embodiment, the audio signals may be sampled into windows of samples of a random size. In other words, the numbers of the samples in the windows are different random numbers, irrespective of the associated frequency range. In a similar manner, the shifting may be done by a random amount. This all may aid in removing artifacts that occur as a result of accelerating periodic audio signals.

Finally, the audio signals may then be encoded for synchronous output with the associated digital video signals. Note operation 714. Again, this encoding may be accomplished with an AC-3 encoder like that mentioned hereinabove. To this end, the audio signals are capable of being played back from a digital medium (i.e. DVD) in an accelerated manner in a quality manner.

Figure 8:
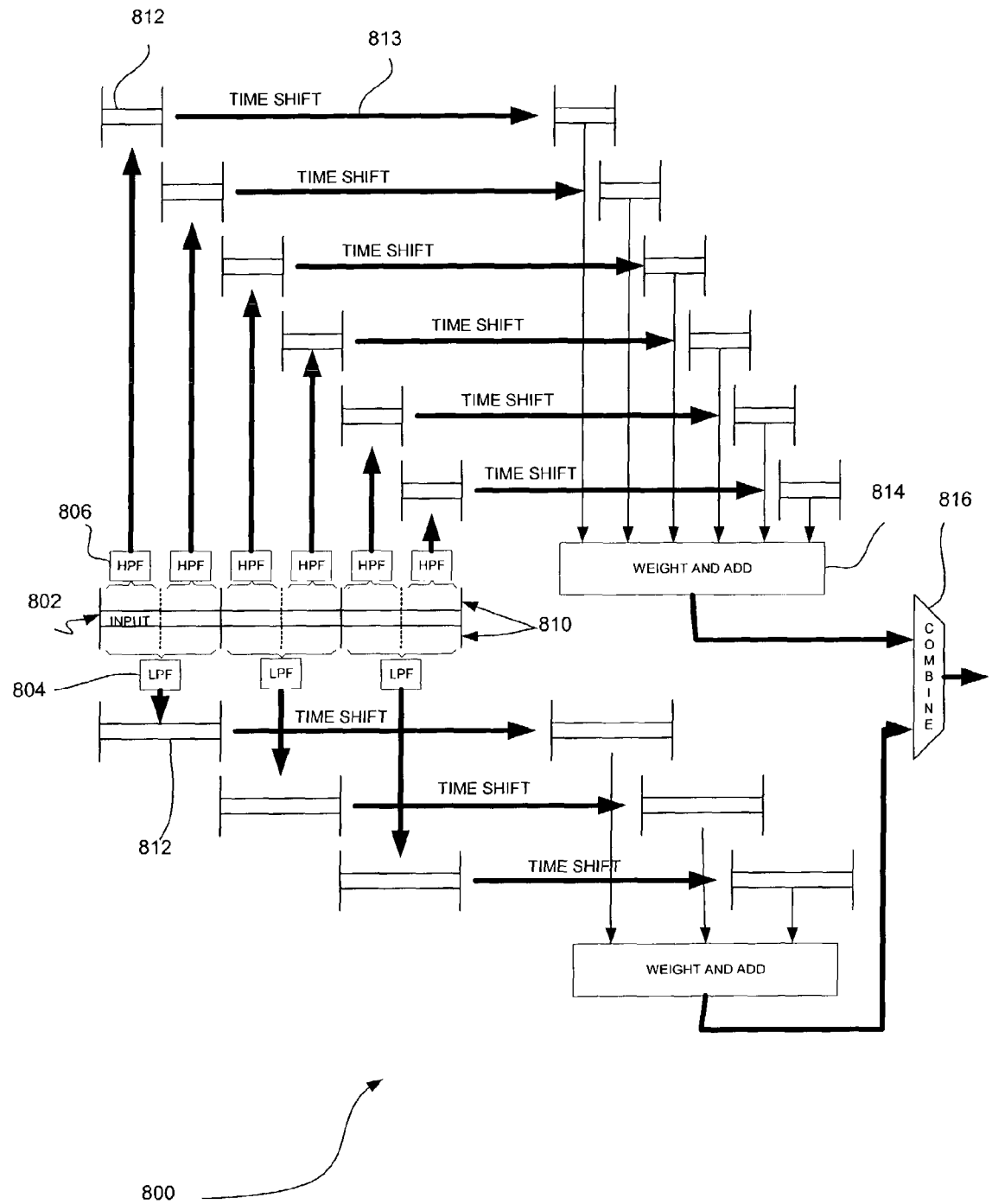
FIG. 8 is a diagram illustrating the SOLA algorithm, in accordance with operation 706 of FIG. 7.

FIG. 8 is a diagram illustrating the SOLA algorithm 800, in accordance with operation 706 of FIG. 7. As shown, decoded audio signals 802 are filtered utilizing low-pass filters 804 and high-pass filters 806. These filters thus separate the audio signals 802 into at least two frequency ranges 810. While only two types of filters are shown in FIG. 8, it should be understood that any number of filters may be used to separate the audio signals into any desired number of ranges.

With continuing reference to FIG. 8, the at least two frequency ranges 810 are sampled into windows of samples 812 of different sizes. In other words, the number of samples 812 in a window associated with a first frequency range 810 may be different from the number of samples 812 in a window associated with a second frequency range 810, etc.

Further, the windows of samples 812 are shifted 813 a common percentage of a size of the window. For example, if a window of samples 812 associated with a first one of the frequency ranges 810 has a duration X, and a time shift Y; and a window of samples 812 associated with a second one of the frequency ranges 810 has a duration Z; the time shift of the window of samples 812 of the second frequency range 810 would be Y/X*Z.

Once shifted, the windows of samples 812 of the at least two frequency ranges are combined using weight and add functions 814 and a combiner function 816. The combined audio signals are then ready for encoding for output purposes.

Figure 9:
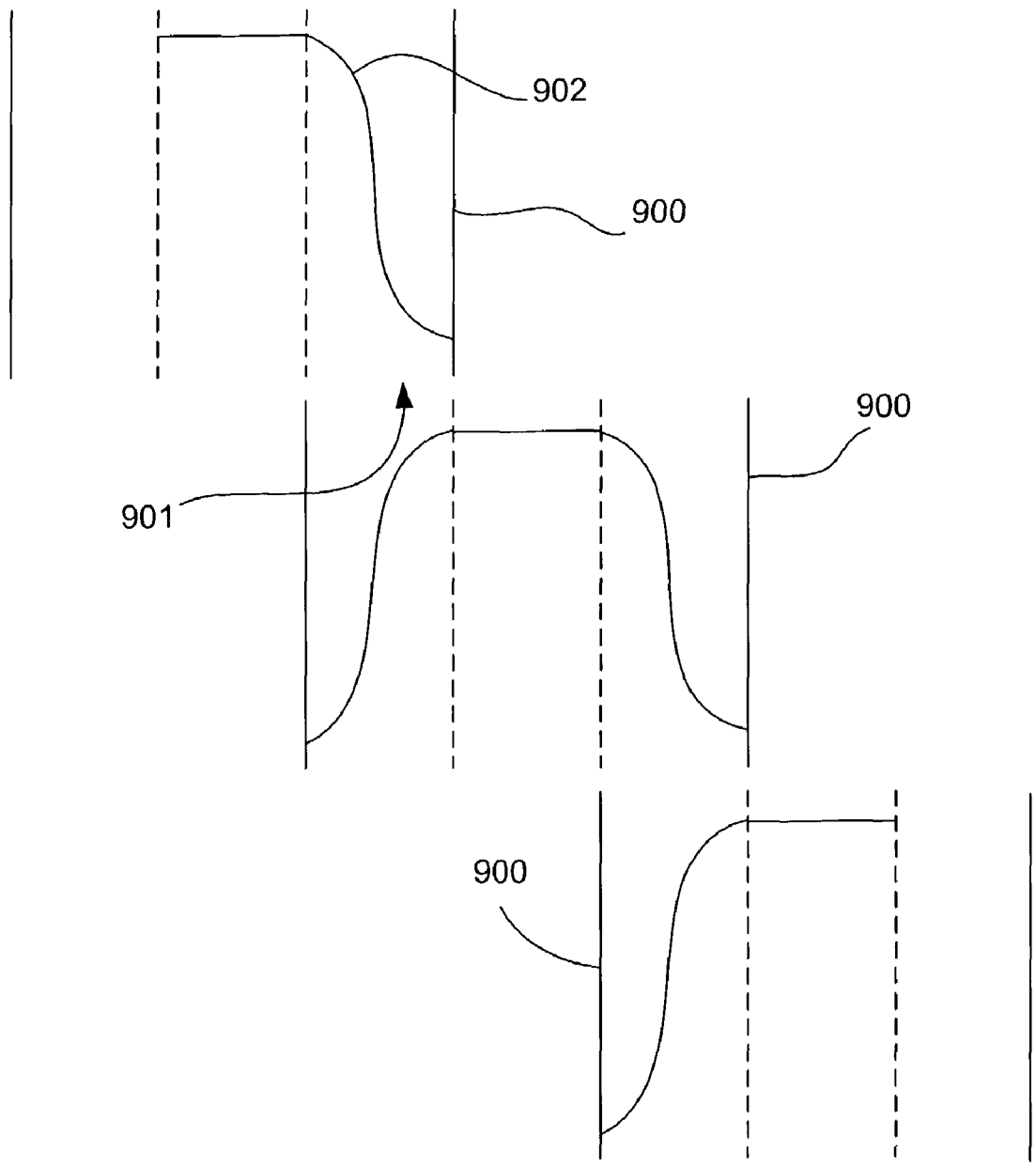
FIG. 9 illustrates the manner in which the different windows of samples may be filtered during the SOLA process to accommodate time shifting.

FIG. 9 illustrates the manner in which the different windows of samples 900 may be filtered during the SOLA process to accommodate time shifting. As shown, a portion 901 of each window of samples 900 may overlap a portion of another window of samples 900. To effect a smooth transition, the overlapping portion 901 of each window of samples 900 may be filtered with, for example, quarter cycle sine and cosine functions 902. This allows an end portion of each window of samples 900 to fade out, while an overlapping front portion of each window of samples 900 fades in. This prevents audible anomalies from taking place. While sine and cosine functions 902 are set forth herein as an example, it should be noted that any functions suitable for cross-fading between signals may be used per the desires of the user.

To this end, the present embodiment is capable of decoding AC-3 compressed digital audio signals received from a digital medium (i.e. DVD), time-scaling the decoded audio signals, and re-encoding the same in an AC-3 compressed digital audio format for quality digital playback.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A computer implemented method for time scaling playback of digital audio signals with associated digital video signals, comprising:
   receiving digital video signals and digital audio signals;
   processing the digital audio signals for the time scaling thereof while preventing an audible anomaly associated with a frequency pitch of the digital audio signals;
   encoding the processed audio signals; and
   outputting the encoded audio signals for accelerated playback with the associated digital video signals;
   wherein randomly sized windows of samples of the digital audio signals are used during the processing of the digital audio signals for the time scaling thereof;
   wherein the randomly sized windows of samples of the digital audio signals are used during the processing for removing artifacts that occur as a result of the accelerated playback;
   wherein the processing further includes filtering the digital audio signals into at least two frequency ranges utilizing filters;
   wherein the processing further includes time shifting the windows of samples of the at least two frequency ranges;
   wherein each window of samples is time shifted a common percentage of a size of the window;
   wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

2. The method as recited in claim 1, wherein the received digital audio signals are decoded.

3. The method as recited in claim 2, wherein the digital audio signals are decoded from a compressed format after being received.

4. The method as recited in claim 3, wherein the digital audio signals are encoded to the compressed format after the processing.

5. The method as recited in claim 1, wherein the digital audio signals are processed utilizing a digital video disc (DVD) player.

6. The method as recited in claim 1, wherein the digital audio signals are processed utilizing a personal computer.

7. The method as recited in claim 1, wherein the digital audio signals are processed utilizing a game unit.

8. The method as recited in claim 1, wherein the digital audio signals are received from a digital video disc (DVD).

9. The method as recited in claim 1, wherein the digital audio signals are received from compact disc-read only memory (CD-ROM).

10. The method as recited in claim 1, wherein the audible anomaly is prevented by preventing audible frequency shifts in the digital audio signals.

11. The method as recited in claim 1, wherein the processing utilizes a Synchronize Overlap and Add (SOLA) process.

12. The method as recited in claim 1, wherein the at least two frequency ranges are processed differently.

13. The method as recited in claim 12, wherein the at least two frequency ranges are processed using the windows of samples of different sizes.

14. The method as recited in claim 1, wherein the processing further includes combining the windows of samples of the at least two frequency ranges.

15. The method as recited in claim 1, wherein the encoding uses an AC-3 format.

16. The method as recited in claim 15, wherein the digital audio signals are decoded from the AC-3 format after being received.

17. The method as recited in claim 1, wherein numbers of the samples in the randomly sized windows are different.

18. A computer program product embodied on a tangible computer readable medium, comprising:
   computer code for receiving digital video signals and digital audio signals;
   computer code for processing the digital audio signals for a time scaling thereof while preserving a frequency pitch of the digital audio signals;
   computer code for encoding the processed audio signals; and
   computer code for outputting the encoded audio signals for accelerated playback with the associated digital video signals;
   wherein the computer program product is operable such that randomly sized windows of samples of the digital audio signals are used during the processing of the digital audio signals for the time scaling thereof;
   wherein the computer program product is operable such that the randomly sized windows of samples of the digital audio signals are used during the processing for removing artifacts that occur as a result of the accelerated playback;

wherein the computer program product is operable such that the processing further includes filtering the digital audio signals into at least two frequency ranges utilizing filters;

wherein the computer program product is operable such that the processing further includes time shifting the windows of samples of the at least two frequency ranges;

wherein the computer program product is operable such that each window of samples is time shifted a common percentage of a size of the window;

wherein the computer program product is operable such that the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

19. A system, comprising:
means for receiving digital video signals and digital audio signals;
means for processing the digital audio signals for a time scaling thereof while preventing an audible anomaly associated with a frequency pitch of the digital audio signals;
means for encoding the processed audio signals; and
means for outputting the encoded audio signals for accelerated playback with the associated digital video signals;
wherein the system is operable such that randomly sized windows of samples of the digital audio signals are used during the processing of the digital audio signals for the time scaling thereof;
wherein the system is operable such that the randomly sized windows of samples of the digital audio signals are used during the processing for removing artifacts that occur as a result of the accelerated playback;
wherein the system is operable such that the processing further includes filtering the digital audio signals into at least two frequency ranges utilizing filters;
wherein the system is operable such that the processing further includes time shifting the windows of samples of the at least two frequency ranges;
wherein the system is operable such that each window of samples is time shifted a common percentage of a size of the window;
wherein the system is operable such that the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

20. A computer implemented method for time scaling playback of digital audio signals with associated digital video signals, comprising:
receiving digital video signals and digital audio signals;
processing the digital audio signals for the time scaling thereof utilizing a Synchronize Overlap and Add (SOLA) process;
encoding the processed audio signals; and
outputting the encoded audio signals for accelerated playback with the associated digital video signals;
wherein randomly sized windows of samples of the digital audio signals are used during the processing of the digital audio signals for the time scaling thereof;
wherein the randomly sized windows of samples of the digital audio signals are used during the processing for removing artifacts that occur as a result of the accelerated playback;
wherein the processing further includes filtering the digital audio signals into at least two frequency ranges utilizing filters;
wherein the processing further includes time shifting the windows of samples of the at least two frequency ranges;
wherein each window of samples is time shifted a common percentage of a size of the window;
wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

21. A system, comprising:
a digital video disc (DVD) player for reading digital video signals and digital audio signals from a DVD;
a decoder coupled to the DVD player for decoding the digital audio signals;
a processor unit coupled to the decoder, the processor unit adapted for processing the digital audio signals for a time scaling thereof utilizing a Synchronize Overlap and Add (SOLA) process; and
an encoder coupled to the processor unit, the encoder adapted for encoding the processed audio signals;
wherein the system is operable such that randomly sized windows of samples of the digital audio signals are used during the processing of the digital audio signals for the time scaling thereof;
wherein the system is operable such that the randomly sized windows of samples of the digital audio signals are used during the processing for removing artifacts that occur as a result of accelerated playback;
wherein the system is operable such that the processing further includes filtering the digital audio signals into at least two frequency ranges utilizing filters;
wherein the system is operable such that the processing further includes time shifting the windows of samples of the at least two frequency ranges;
wherein the system is operable such that each window of samples is time shifted a common percentage of a size of the window;
wherein the system is operable such that the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

22. A computer implemented method for time scaling playback of digital audio signals with associated digital video signals, comprising:
decoding digital audio signals;
filtering the digital audio signals into at least two frequency ranges utilizing a plurality of filters;

processing the at least two frequency ranges of the digital audio signals for the time scaling thereof, wherein the digital audio signals are processed utilizing a Synchronize Overlap and Add (SOLA) process;

encoding the processed audio signals; and outputting the encoded audio signals for accelerated playback with the associated digital video signals;

wherein randomly sized windows of samples of the digital audio signals are used during the processing of the digital audio signals for the time scaling thereof;

wherein the randomly sized windows of samples of the digital audio signals are used during the processing for removing artifacts that occur as a result of the accelerated playback;

wherein the processing further includes time shifting the windows of samples of the at least two frequency ranges;

wherein each window of samples is time shifted a common percentage of a size of the window;

wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

23. The method as recited in claim 22, wherein the at least two frequency ranges are processed differently.

24. The method as recited in claim 23, wherein the windows of samples are of different sizes.

25. The method as recited in claim 22, wherein the processing further includes combining the windows of samples of the at least two frequency ranges.

26. The method as recited in claim 22, wherein the digital audio signals are decoded from a compressed format after being received.

27. The method as recited in claim 26, wherein the digital audio signals are encoded to the compressed format after the processing.

28. The method as recited in claim 22, wherein the digital audio signals are processed utilizing a digital video disc (DVD) player.

29. The method as recited in claim 22, wherein the digital audio signals are processed utilizing a personal computer.

30. The method as recited in claim 22, wherein the digital audio signals are processed utilizing a game unit.

31. The method as recited in claim 22, wherein the digital audio signals are received from a digital video disc (DVD).

32. The method as recited in claim 22, wherein the digital audio signals are received from compact disc-read only memory (CD-ROM).

33. A computer implemented method for time scaling playback of a digital audio signal, comprising:

filtering a digital audio signal into at least two frequency ranges, each of the at least two frequency ranges comprising a sequence of samples;

for each of the at least two frequency ranges, selecting a plurality of windows, each window comprising a subset of the sequence;

for each of the at least two frequency ranges, shifting the time corresponding to the samples in the windows, thereby causing the windows to overlap in time;

for each of the at least two frequency ranges, weighting the samples in the windows; and forming an accelerated representation of the digital audio signal by combining the weighted and shifted samples in the at least two frequency ranges;

wherein a number of samples in at least some of the selected windows is a random amount;

wherein the selected windows with the random number of samples are used during processing of the digital audio signal for the time scaling thereof, for removing artifacts that occur as a result of accelerated playback;

wherein the processing further includes time shifting the windows of samples of the at least two frequency ranges;

wherein each window of samples is time shifted a common percentage of a size of the window;

wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

34. The method as recited in claim 33, wherein the at least two frequency ranges are processed differently.

35. The method as recited in claim 33, wherein the windows for at least two frequency ranges have a different number of samples.

36. The method as recited in claim 33, wherein the combining is performed on samples corresponding to an approximately identical time.

37. A computer implemented method for time scaling playback of digital audio signals with associated digital video signals, comprising:

decoding digital audio signals;

filtering the digital audio signals into at least two frequency ranges utilizing a plurality of filters;

processing the at least two frequency ranges of the digital audio signals for the time scaling thereof, wherein the digital audio signals are processed by:

time shifting windows of samples of the at least two frequency ranges, and combining the windows of samples;

encoding the processed audio signals; and outputting the encoded audio signals for accelerated playback with the associated digital video signals;

wherein randomly sized windows of samples are used during the processing of the at least two frequency ranges of the digital audio signals for the time scaling thereof;

wherein the randomly sized windows of samples of the digital audio signals are used during the processing for removing artifacts that occur as a result of the accelerated playback;

wherein each window of samples is time shifted a common percentage of a size of the window;

wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

38. The method as recited in claim 37, wherein the digital audio signals are decoded from a compressed format after being received.

39. The method as recited in claim 38, wherein the digital audio signals are encoded to the compressed format after the processing.

40. The method as recited in claim 37, wherein the digital audio signals are processed utilizing a digital video disc (DVD) player.

41. The method as recited in claim 37, wherein the digital audio signals are processed utilizing a personal computer.

42. The method as recited in claim 37, wherein the digital audio signals are processed utilizing a game unit.

43. The method as recited in claim 37, wherein the digital audio signals are received from a digital video disc (DVD).

44. The method as recited in claim 37, wherein the digital audio signals are received from compact disc-read only memory (CD-ROM).

45. A computer implemented method for time scaling playback of digital audio signals with associated digital video signals, comprising:
decoding digital audio signals;
processing the digital audio signals for the time scaling thereof using randomly sized windows of samples of the digital audio signals, wherein the digital audio signals are processed utilizing a Synchronize Overlap and Add (SOLA) process;
encoding the processed audio signals; and
outputting the encoded audio signals for accelerated playback with the associated digital video signals;
wherein the randomly sized windows of samples of the digital audio signals are used during the processing for removing artifacts that occur as a result of the accelerated playback;
wherein the processing further includes filtering the digital audio signals into at least two frequency ranges utilizing filters;
wherein the processing further includes time shifting the windows of samples of the at least two frequency ranges;
wherein each window of samples is time shifted a common percentage of a size of the window;
wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

46. A computer implemented method for time scaling playback of digital audio signals with associated digital video signals, comprising:
decoding digital audio signals;
processing samples of the digital audio signals for the time scaling thereof using randomly sized windows of samples of the digital audio signals, wherein the digital audio signals are processed by:
time shifting the windows of samples, and
combining the windows of samples;
encoding the processed audio signals; and
outputting the encoded audio signals for accelerated playback with the associated digital video signals;
wherein the randomly sized windows of samples of the digital audio signals are used during the processing for removing artifacts that occur as a result of the accelerated playback;
wherein the processing further includes filtering the digital audio signals into at least two frequency ranges utilizing filters;
wherein the processing further includes the time shifting of the windows of samples of the at least two frequency ranges;
wherein each window of samples is time shifted a common percentage of a size of the window;
wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

47. The method as recited in claim 46, wherein the randomly sized windows of samples are used for reducing audible anomalies resulting from time scaling periodic audio signals.

48. The method as recited in claim 46, wherein a number of samples in each window is random so that the windows of samples are randomly sized.

49. The method as recited in claim 46, wherein the digital audio signals are decoded from a compressed format after being received.

50. The method as recited in claim 49, wherein the digital audio signals are encoded to the compressed format after the processing.

51. The method as recited in claim 46, wherein the digital audio signals are processed utilizing a digital video disc (DVD) player.

52. The method as recited in claim 46, wherein the digital audio signals are processed utilizing a personal computer.

53. The method as recited in claim 46, wherein the digital audio signals are processed utilizing a game unit.

54. The method as recited in claim 46, wherein the digital audio signals are received from a digital video disc (DVD).

55. The method as recited in claim 46, wherein the digital audio signals are received from compact disc-read only memory (CD-ROM).

56. A computer implemented method for time scaling playback of a digital audio signal, comprising:
receiving a digital audio signal as a sequence of samples;
selecting a plurality of windows, each window comprising a subset of the sequence, the number of the samples in the windows being different random numbers;
shifting a time corresponding to the samples in each window, thereby causing the windows to overlap in time;
weighting the samples in the windows; and
forming an accelerated representation of the digital audio signal by combining the weighted and shifted samples;
wherein the plurality of windows are used during processing of the digital audio signal for the time scaling thereof, for removing artifacts that occur as a result of accelerated playback;
wherein the processing further includes filtering the digital audio signal into at least two frequency ranges utilizing filters;
wherein the shifting for each window is a common percentage of a size of the windows;
wherein the shifting for each window the common percentage of the size of the windows includes shifting a second window associated with a second frequency range based on a shift of a first window associated with a first frequency range divided by a duration of the first window, and then multiplied by a duration of the second window.

57. The method as recited in claim 56, wherein the combining is performed on samples corresponding to an approximately identical time.

58. A computer implemented method for time scaling playback of digital audio signals with associated digital video signals, comprising:
decoding digital audio signals;
filtering the digital audio signals into at least two frequency ranges utilizing a plurality of filters;

processing the digital audio signals for the time scaling thereof using windows of samples of different sizes based on the associated frequency range thereof, wherein the windows of samples associated with at least one of the frequency ranges are sized randomly, wherein the digital audio signals are processed utilizing a Synchronize Overlap and Add (SOLA) process including:
   time shifting each window of samples a common percentage of a size of the window, and
   combining the windows of samples; and
encoding the digital audio signals;
wherein the randomly sized windows of samples of the digital audio signals are used during the processing for removing artifacts that occur as a result of accelerated playback;
wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

59. A computer implemented method for time scaling playback of digital audio signals with associated digital video signals, comprising:
   receiving digital video signals and digital audio signals;
   processing the digital audio signals for the time scaling thereof while preventing an audible anomaly associated with a frequency pitch of the digital audio signals;
   encoding the processed audio signals by filtering the processed audio signals into at least two frequency ranges utilizing filters; and
   outputting the encoded audio signals for accelerated playback with the associated digital video signals;
   wherein the at least two frequency ranges are processed using windows of samples of different random sizes;
   wherein the randomly sized windows of samples are used during the processing for removing artifacts that occur as a result of the accelerated playback;
   wherein the processing further includes time shifting the windows of samples of the at least two frequency ranges;
   wherein each window of samples is time shifted a common percentage of a size of the window;
   wherein the time shifting of each window of samples the common percentage of the size of the window includes time shifting a second window of samples associated with a second frequency range based on a time shift of a first window of samples associated with a first frequency range divided by a duration of the first window of samples, and then multiplied by a duration of the second window of samples.

* * * * *